United States Patent
Suzuki et al.

(10) Patent No.: US 9,453,653 B2
(45) Date of Patent: Sep. 27, 2016

(54) AIR CONDITIONING SYSTEM USING DEEP SEAWATER

(71) Applicant: Hitachi, Ltd., Tokyo (JP)

(72) Inventors: Koji Suzuki, Tokyo (JP); Hisatoshi Takitani, Tokyo (JP); Yukihiro Hachiya, Tokyo (JP)

(73) Assignee: HITACHI, LTD., Tokyo (JP)

(*) Notice: Subject to any disclaimer, the term of this patent is extended or adjusted under 35 U.S.C. 154(b) by 125 days.

(21) Appl. No.: 14/103,934

(22) Filed: Dec. 12, 2013

(65) Prior Publication Data

US 2014/0166261 A1 Jun. 19, 2014

(30) Foreign Application Priority Data

Dec. 13, 2012 (JP) ................................ 2012-272342

(51) Int. Cl.
*F24J 3/08* (2006.01)
*F24F 11/00* (2006.01)
*F24F 5/00* (2006.01)

(52) U.S. Cl.
CPC ............ *F24F 11/006* (2013.01); *F24F 5/0046* (2013.01); *F24F 2005/0053* (2013.01);
(Continued)

(58) Field of Classification Search
CPC ........ F25B 7/00; F25B 25/00; F25B 25/005; F25B 2312/02; Y02B 10/40; F24F 2011/0046; F24F 2011/0058; F24F 11/006; F24F 5/0046; F24F 2005/0053; F24F 2011/0075; Y02E 10/34
USPC ...... 165/238, 239, 45, 270; 62/175, 79, 332, 62/335, 260; 137/8–10, 13–14, 81.2; 417/6–8, 12, 14, 20, 62, 278, 290, 300
See application file for complete search history.

(56) References Cited

U.S. PATENT DOCUMENTS 3,927,531 A * 12/1975 Mikolics ................. F01K 9/003
137/565.3
3,998,267 A * 12/1976 Faiczak ................. F24D 11/003
137/357

(Continued)

FOREIGN PATENT DOCUMENTS

| JP | 8-21650 A | 1/1996 |
| JP | 2001-289482 A | 10/2001 |
| JP | 2011-242036 A | 12/2011 |

OTHER PUBLICATIONS

Notice of reasons of rejection for JP patent application No. 2012-272342, dated Mar. 15, 2016.

*Primary Examiner* — Judy Swann
*Assistant Examiner* — Jose O Class-Quinones

(57) ABSTRACT

Air conditioning system using deep seawater, including: a first pump pumping deep seawater; a seawater-coolant heat exchanger receiving pumped seawater, and performing heat exchange between a cold energy in pumped deep seawater and a coolant; an air conditioning heat exchanger receiving the coolant, and performing heat exchange with the coolant, to release cold energy in a target facility to cool the target facility; a fluid circulating system circulating the coolant between the seawater-coolant heat exchanger and air conditioning heat exchanger through a pipe using a second pump; and an operation controller controlling driving of the first pump at timing in advance of when a variation is anticipated in predicted heat loads of the target facility, based on a prediction operation status value and a predicted weather status value of the target facility, and based on a time lag due to a length of the pipe in the fluid circulating system.

4 Claims, 5 Drawing Sheets

(52) U.S. Cl.
CPC . *F24F2011/0046* (2013.01); *F24F 2011/0058* (2013.01); *F24F 2011/0075* (2013.01); *Y02B 10/40* (2013.01)

(56) References Cited

U.S. PATENT DOCUMENTS

| | | | | |
|---|---|---|---|---|
| 4,057,721 A | * | 11/1977 | deVial | G01N 21/64 250/301 |
| 4,417,446 A | * | 11/1983 | Nakamoto | F01K 23/04 60/641.7 |
| 4,775,944 A | * | 10/1988 | Nakamura | G05D 23/1917 165/205 |
| 5,505,180 A | * | 4/1996 | Otterman | F02D 41/2464 123/497 |
| 5,967,085 A | * | 10/1999 | Kawamura | A01K 63/04 119/215 |
| 6,085,532 A | * | 7/2000 | Sibik | F25B 49/02 62/177 |
| 6,095,426 A | * | 8/2000 | Ahmed | F24F 11/006 165/217 |
| 2004/0255601 A1 | * | 12/2004 | Kwon | F24F 11/0086 62/157 |
| 2007/0169481 A1 | | 7/2007 | Xu | |
| 2010/0275596 A1 | * | 11/2010 | Labelle | E21B 7/185 60/641.2 |
| 2010/0275624 A1 | * | 11/2010 | Lee | F24F 11/008 62/115 |
| 2010/0300095 A1 | * | 12/2010 | Sakurai | F03G 7/04 60/641.7 |
| 2013/0142669 A1 | * | 6/2013 | Pyle | F01P 7/164 417/12 |
| 2013/0146437 A1 | * | 6/2013 | Maurer | F28F 1/10 202/185.1 |

\* cited by examiner

| Load variation time | Predicted load | Control start time | | | Inverter frequency of pumps 3, 5, 8 |
|---|---|---|---|---|---|
| | | Pump 3 | Pump 5 | Pump 8 | |
| 6:00 | L1 Small | 5:16 | 5:21 | 5:50 | 30 Hz |
| 9:00 | L2 | 8:33 | 8:37 | 8:53 | 40 Hz |
| 12:00 | L3 Large | 11:45 | 11:47 | 11:55 | 45 Hz |
| ⋮ | ⋮ | ⋮ | ⋮ | ⋮ | ⋮ |

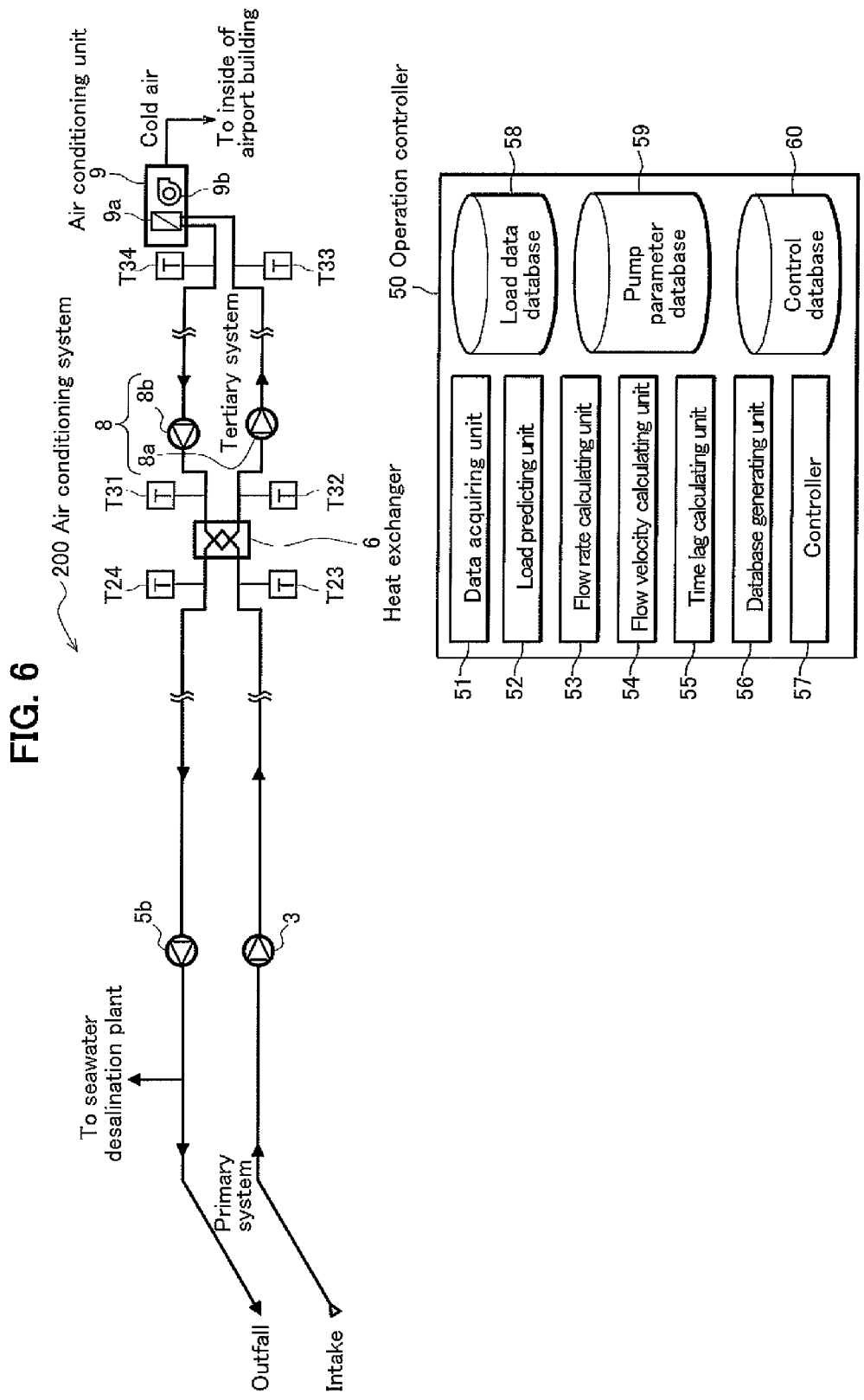

AIR CONDITIONING SYSTEM USING DEEP SEAWATER

CROSS-REFERENCE TO RELATED APPLICATION

This application claims the foreign priority benefit under 35 U.S.C. §119 of Japanese Patent Application No. 2012-272342, filed on Dec. 13, 2012, the entire contents of which are incorporated herein by reference.

1. FIELD OF THE INVENTION

The present invention relates to an air conditioning system using deep seawater.

2. DESCRIPTION OF THE RELATED ART

Deep seawater in a deep sea is utilized in an air conditioning system. As a specific utilizing method, for example, JP2011-242036 A discloses an air conditioning system in which a heat-converted medium can be cooled by a cold energy that the deep seawater has and produce fresh water from the deep seawater at a high efficiency.

In JP2011-242036 A, a distance from an intake of the deep seawater to the air conditioning unit becomes generally long. More specifically, not only a distance across an intake pipe for pumping the deep seawater, but also a distance of a cold water pipe from a heat exchanger which is first supplied with the pumped deep seawater to an indoor unit (equipped with the air conditioning unit) becomes long. Regarding this, fresh water supplied with a cold energy of the deep seawater by the heat exchanger flows through the cold water pipe. In addition, a distance across a cold water pipe equipped inside the air conditioning unit may become also long.

Accordingly, time necessary for the cold energy in the deep seawater to be exhausted to the external through the indoor unit of the air conditioning unit becomes long. Accordingly, it takes a long time for the cold energy in the deep seawater until the cold energy in the deep seawater is released from the air conditioner, though a pumping quantity of the deep seawater is increased because an air conditioning load on the air conditioning unit increases (for example, in a case where a temperature near the air conditioning unit increases). In other words, in the technology described in JP2011-242036 A, a tracking performance to a variation of the air conditioning load may decrease.

In consideration of such a problem, it is supposed that the deep seawater is pumped as much as the status allows from an initial stage so that the obtained cold energy can be used. However, there may be a case where an energy consumption become excessive because a lot of the deep seawater is pumped irrespective of the variation in the air conditioning load.

SUMMARY OF THE INVENTION

An aspect of the present invention provides an air conditioning system using the deep seawater having both a favorable tracking performance and a favorable energy saving property.

An aspect of the present invention provides an air conditioning system using deep seawater, comprising:

a pump device pumping deep seawater in a sea;

a seawater-coolant heat exchanger performing heat exchange between a cold energy in the pumped deep seawater and a coolant;

an air conditioning heat exchanger performing heat exchange with the coolant cooled by the cold energy in the deep seawater to release the cold energy in a target facility to cool the target facility;

a coolant circulating system circulating the coolant between the seawater-coolant heat exchanger and the air conditioning heat exchanger through a pipe and a pump; and an operation controller driving the pump at timing when a variation is anticipated in the predicted heat loads on the basis of the predicted heat load of the target facility predicted from a prediction value of an operation status of the target facility and a prediction value of a weather status at the place on which the target facilitate is located and a time lag due to a length of the pipe in the coolant circulating system.

According to the invention, there is provided the air conditioning system using the deep seawater having both the tracking performance and the energy saving property.

BRIEF DESCRIPTION OF THE DRAWINGS

FIG. 6 is a block diagram of the air conditioning system of a modification of the embodiment.

DETAILED DESCRIPTION OF THE INVENTION

Embodiments of the present invention will be described below. However, the invention is not limited to the embodiments below, but may be modified without departure from the subject matter of the invention.

In the air conditioning system using the deep seawater according to the embodiment, air conditioning (cooling) of the airport building is performed using the deep seawater. In this case, a distance between an intake location of the deep seawater and the air conditioning unit in the airport building becomes long. Accordingly, it takes long time until supplying a cold air is started in response to a load variation though a flow rate of cold air is controlled by controlling a flow rate of the deep seawater when a variation in the air conditioning load in the airport building occurs. Therefore, in the air conditioning system using the deep seawater according to the embodiment, the load variation in the airport building is predicted so that the flow rate of the deep seawater is made previously controllable on the basis of a prediction result.

First, a configuration of the air conditioning system using the deep seawater according to the embodiment will be described and next, the control of the air conditioning system will be described.

[Configuration]

Figure 1:
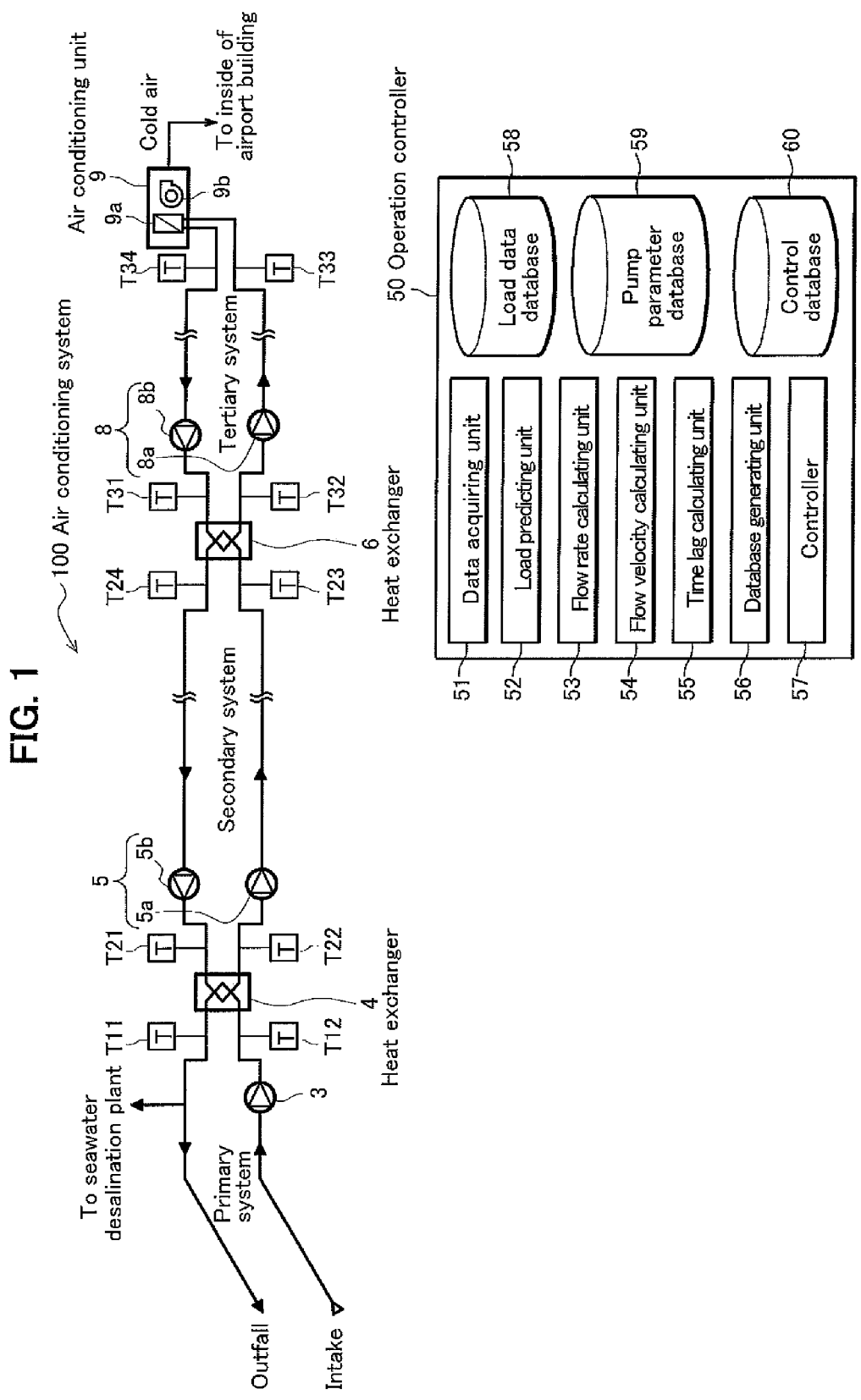
FIG. 1 is a block diagram of an air conditioning system using deep seawater according to an embodiment of the present invention.

FIG. 1 is a block diagram of the air conditioning system using the deep seawater according to the embodiment. FIG. 1 shows an air conditioning system using deep seawater 100 (hereinafter, referred to as an air conditioning system 100) performing air conditioning for a target facility (building, the airport building not shown) using the cold energy in the deep seawater. Accordingly, in this embodiment, a cooling unit such as a chiller is not provided.

The deep seawater is seawater at a depth of about several hundreds meters below a sea level. A temperature of the deep seawater is about 4 degrees Celsius to 8 degrees Celsius throughout a year. The deep seawater is drawn from an intake in the sea into the air conditioning system 100. The deep seawater after drawn into the air conditioning system 100 and the cold energy has been collected is returned to the sea through an outfall. However, in the air conditioning system 100, a part of the deep seawater after the cold energy collection is supplied to a seawater desalination plant (not shown) to undergo a seawater desalination process to use processed water as, for example, a tap water.

In the air conditioning system 100, the deep seawater flows through a primary system shown in FIG. 1. On the other hand, in secondary and tertiary systems, coolants flow therethrough, so that the cold energy in the deep seawater is transferred to an air conditioning unit 9 through the coolant flowing through the secondary system and the coolant flowing through the tertiary system. In other words, each of the secondary system and the tertiary system is, though a detailed description will be made later, a coolant circulating system for circulating the coolant through a heat exchanger 4 and a heat exchanger 6.

In the embodiment, a single distance of the secondary system is one to several kilometers, and a single distance of the tertiary system is also one to several kilometers. Accordingly, in the system, there are coolant circulation systems which are very long even if only the land parts are regarded such that the total single lengths of the secondary and the tertiary systems are several kilometers (specific distances will be described later). Accordingly, in the air conditioning system 100, there are time lags in proportion to the distances. In the embodiment, the control is performed in consideration of such time lags. Detailed descriptions about the control will be made later.

The air conditioning system 100 includes a pump (pumping unit) 3 for pumping the deep seawater from the sea, the air conditioning unit 9 for releasing the cold energy in the deep seawater pumped by the pump 3 into the airport building, and an operation controller 50 for controlling the pump 3. In addition, the air conditioning system 100 includes the heat exchanger 4, pumps 5 (5a, 5b), the heat exchanger 6, and pumps 8 (8a, 8b) to transfer the cold energy in the deep seawater to the air conditioning unit 9. Pipes connected to these units are provided with temperature sensor T11, T12, T21, T22, T23, T24, T31, T32, T33, and T34 for measuring temperatures of the deep seawater and the coolants flowing through parts of the pipes. Regarding this, the deep seawater flows through the primary system and the coolants flowing through the secondary and tertiary systems. Particularly, the coolants in the secondary and tertiary systems are circulated independently.

In addition, through a detailed description will be made later, in the air conditioning system 100, the pumps 3, 5, and 8 and the heat exchangers 4, 6 and the coolant flowing therethrough cooperate to transfer the cold energy in the deep seawater to the air conditioning unit 9. The cold energy transferred to the air conditioning unit 9 is supplied to an inside of the airport building (not shown).

The pump 3 is installed in the primary system and pumps the deep seawater from the sea. The pump 3 is frequency-controlled by an inverter (not shown) to control a flow rate of pumped deep seawater.

In addition, the pumps 5 are installed in the secondary system and circulate the coolant which has received the cold energy in the deep seawater pumped by the pump 3. The pumps 5 are frequency-controlled by an inverter (not shown) to control a flow rate of the coolant.

In addition, the pumps 8 are installed in the tertiary system and circulate the coolant which has received the cold energy in the coolant in the secondary system. The pump 3 is frequency-controlled by an inverter (not shown) to control a flow rate of the circulated coolant.

The operation controller 50 changes the inverter frequencies of the pumps 3, 5, and 8. Incidentally, in the embodiment, with increase in the air conditioning load on the air conditioning unit 9 a quantity (flow rate) of the pumped deep seawater by the pump 3 is increased and circulating flow rates of the coolants by the pumps 5 and 8 are also increased.

The heat exchanger 4 heat-exchanges between the deep seawater pumped by the pump 3 and the coolant flowing through the secondary system. More specifically, the cold energy in the pumped deep seawater is transferred to the coolant in the heat exchanger 4. The coolant having received the cold energy is transferred to the heat exchanger 6 by the pump 5.

In addition, the heat exchanger 6 performs heat exchange between the coolant flowing through the primary system and the coolant flowing through the secondary system. In other words, the cold energy in the coolant flowing through the primary system is transferred to the coolant flowing through the secondary system in the heat exchanger 6.

Out of the pipes forming the secondary system (secondary system pipes), the secondary system pipe extending (running the coolant) from the heat exchanger 4 to the heat exchanger 6 is provided with a heat insulating material (not shown) for suppressing heat transferring between the secondary pipe and the outside therearound. Accordingly, the cold energy transpiration from the coolant to the outside, i.e., heat absorption by the coolant from the outside) can be suppressed. On the other hand, there is no heat insulating material around the secondary pipe (returning pipe) extending from the heat exchanger 6 to the heat exchanger 4. In other words, the temperature of the coolant transferring from the heat exchanger 6 to the heat exchanger 4 can be varied by the outdoor air.

The air conditioning unit 9 is installed in the airport and releases the cold energy from the deep seawater as cold air in the airport building. The air conditioning unit 9 is provided with a heat exchanger 9a and a fan 9b. Accordingly, the cold energy from the deep seawater is transferred to the air conditioning unit 9 through the coolant flowing through the secondary system and the coolant flowing through the tertiary system. The heat exchanger 9a in the air conditioning unit 9 performs heat exchange with the air in the airport building. Accordingly, the cold energy from the deep seawater is released in the airport building as cold air by the fan 9b.

The temperature sensors T11, T12, T21, T22, T23, T24, T31, T32, T33, and T34 (hereinafter referred to as temperature sensors T) measure temperatures of the flowing deep seawater and the flowing coolants. More specifically, the temperature sensor T11 measures the temperature of the deep seawater exhausted by the heat exchanger 4 and is returned to the sea through the outfall. The temperature sensor T12 measures the temperature of the deep seawater pumped by the pump 3. The temperature sensor T21 measures the temperature of the coolant flowing through the secondary system and just before being supplied to the heat exchanger 4. The temperature sensor T22 measures the temperature of the coolant exhausted by the heat exchanger 4 and flowing to the heat exchanger 6.

The temperature sensor T23 measures the temperature of the coolant flowing through the secondary system and just before being supplied to the heat exchanger 6. The temperature sensor T24 measures the temperature of the coolant exhausted by the heat exchanger 6 and flowing to the heat exchanger 4.

The temperature sensor T31 measures the temperature of the coolant flowing through the tertiary system and just before being supplied to the heat exchanger 6. The temperature sensor T32 measures the temperature of the coolant exhausted by the heat exchanger 6 and flowing to the air conditioning unit 9. The temperature sensor T33 measures the temperature of the coolant flowing through the tertiary system and just before being supplied to the air conditioning unit 9. The temperature sensor T34 measures the temperature of the coolant exhausted by the air conditioning unit 9 and flowing to the heat exchanger 6.

These temperature sensors T are used as indexes for a feedback control. For example, when the temperature measured by the temperature sensor T11 becomes higher than the target value, it can be considered that a heat received from the secondary system becomes large in quantity because the air conditioning load on the air conditioning unit 9 becomes large. In such a case, the pump 3 is controlled to increase a flow rate of the pumped deep seawater.

In addition, for example, when the temperature measured by the temperature sensor T24 is higher than the target value, it can be considered that a heat quantity exhausted by the air conditioning unit 9 becomes large because the air conditioning load against the air conditioning unit 9 becomes large. Then, the flow rate of the coolant flowing through the secondary system is increased by controlling the pump 5, so that the cold energy quantity supplied to the air conditioning unit 9.

Other temperature sensors are controlled similarly.

A seawater desalination plant (not shown) is supplied with a part of the deep seawater of which the cold energy is removed by the heat exchanger 4. In the seawater desalination plant, desalination of the deep seawater is performed. A specific means and configuration of the seawater desalination plant are not limited, for example, a seawater desalination plant using a reverse osmosis membrane (RO membrane) can be used. Regarding this, the higher temperature the seawater (deep seawater) supplied to the seawater desalination plant has, an efficiency of seawater desalination also increases.

The operation controller 50 changes the inverter frequencies for the pumps 3, 5, and 8 on the basis of the data of a weather forecast, data of the airport building (the number of users, etc.) and data from the temperature sensors T. The operation controller 50 is connected to these units with electric signal lines (not shown). The operation controller 50 includes the data acquiring unit 51, the load predicting unit 52, a flow rate calculating unit 53, a flow velocity calculating unit 54, a time lag calculating unit 55, a database generating unit 56, a controller 57, a load information database 58, a pump parameter database 59, and a control database 60.

The data acquiring unit 51 is a unit for acquiring load data of the air conditioning system 100. The load data acquired is stored in the load data database 58.

The load predicting unit 52 is a unit for predicting the air conditioning load on the basis of the data acquired by the data acquiring unit 51.

The flow rate calculating unit 53 calculates a flow rate of the pumped deep seawater on the basis of the air conditioning load predicted by the load predicting unit 52.

The flow velocity calculating unit 54 calculates a flow velocity of the deep seawater on the basis of the flow rate calculated by the flow rate calculating unit 53.

The time lag calculating unit 55 calculates a time lag on the basis of the flow velocity calculated by the flow velocity calculating unit 54.

The database generating unit 56 generates the control database 60 with reference to the pump parameter database 59. The pump parameter database 59 stores a relation between the flow velocity and the inverter frequency. Accordingly, the control database 60 stores the time lag (start of pumping) calculated by the time lag calculating unit 55 and the inverter frequencies of the pumps 3, 5, and 8 to have flow velocities calculated by the flow velocity calculating unit 54 with association therebetween.

The controller 57 controls the pumps 3, 5, and 8 on the basis of the control database 60.

Functions of operations of these units will be described later.

The operation controller 50 includes a CPU (Central Processing Unit) (not shown), a RAM (Random Access Memory)(not shown), a ROM (Read Only Memory)(not shown), and a HDD (Hard Disc Drive)(not shown), etc. In the operation controller 50, the CPU loads the predetermined programs stored in the ROM and HDD, etc. in the RAM, etc., to execute the programs.

[Operation]

Figure 2:
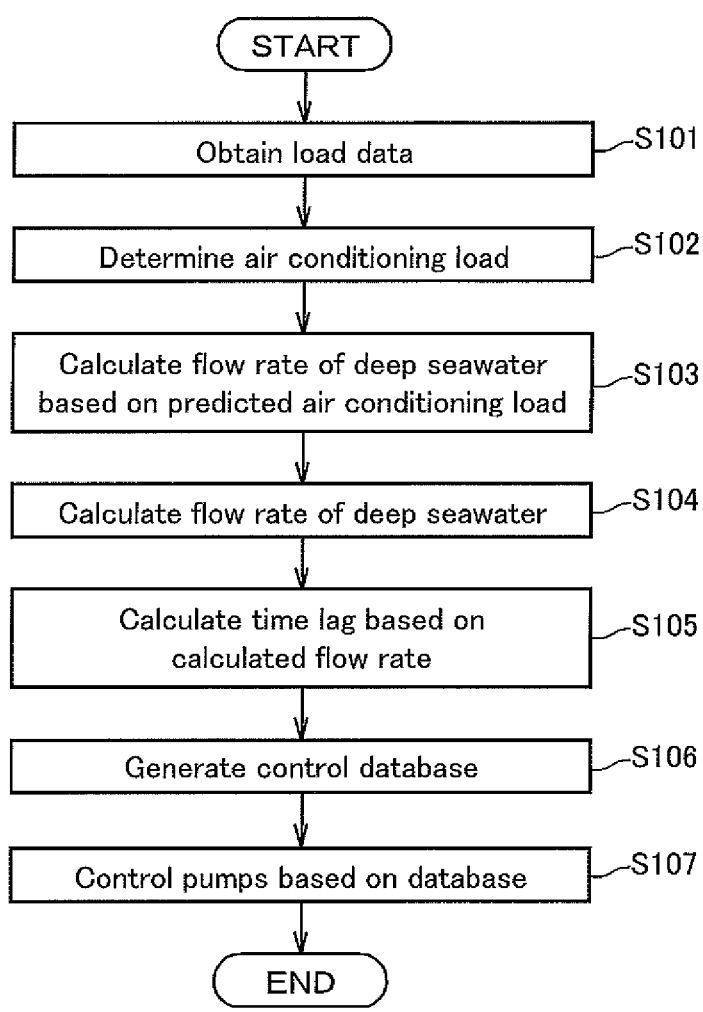
FIG. 2 is a flowchart of a water intake control of the deep seawater and a flow rate control of coolants in the air conditioning system using the deep seawater.

With reference to FIGS. 1 to 4 control by the air conditioning system 100 will be described. A flowchart in FIG. 2 shows an operation by the operation controller 50 shown in FIG. 1. In addition, FIG. 3A shows a temperature variation of the outdoor air at the area where the air conditioning system is installed according to the embodiment. FIG. 3B shows a variation in the number of persons in the airport building where the air conditioning system according to the embodiment is installed. FIG. 3C shows variation of the air conditioning load on the air conditioning unit.

<Step S101>

FIG. 2 is a flowchart showing the deep seawater intake control and the flow rate control of the coolants in the air conditioning system according to the embodiment of the present invention. First, the data acquiring unit 51 (see FIG. 1) obtains load data regarding the air conditioning system 100 at respective timings (step S101). The obtained load data is stored in the load data database 58.

Here, the "load data regarding the air conditioning system 100" is an element which can affect the air conditioning load on the air conditioning unit 9. In the embodiment, the load data is broadly classified into three types of data (outdoor air load data, building load data, and internal load data).

(Outdoor Air Load Data)

The ambient load data is data which relates to the ambient data and can apply a load to the air conditioning unit 9. The outdoor air load mainly includes outdoor air status (an ambient temperature, a humidity, a meteorological phenomenon such as weather), a room air status (a room temperature, a humidity, etc.) and, an intake outdoor air quantity drawn into the airport building from the outside. For example, the temperature in the airport building varies according to hours. More specifically, at night the temperature in the airport building is relatively low because outside walls of the airport building are not irradiated with sunlight. On the other hand, during daytime, the temperature in the airport building is relatively high because the outside walls of the airport building are irradiated with the sunlight.

Figure 3A:
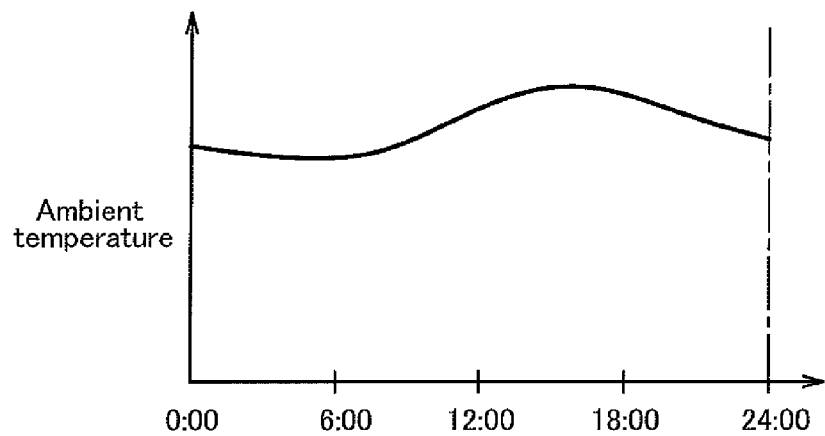
FIG. 3A shows an ambient temperature variation at an area where the air conditioning system according to the embodiment is installed.

In addition, the temperature in the airport building varies in accordance with the ambient temperature. For example, as shown in FIG. 3A, the ambient temperature at about 6:00 before sunrise is lowest and at about 14:00 is highest. Accordingly, if only the ambient temperature is regarded, the air conditioning load at about 6:00 is lowest and at about 14:00 is highest.

Further, the intake outdoor air quantity from the outside into the inside of the airport building is determined in accordance with, for example, the number of persons in the airport building. For example, when there are many persons in the airport building, larger quantity of outdoor air is drawn, so that the temperature in the airport building becomes sensitive to the affection of the outdoor air temperature. On the other hand, when there are few persons in the airport building, little outdoor air is drawn, so that the temperature in the airport building is not sensitive to the affection by the ambient temperature. As described above, the outdoor air load data broadly varies with the operating status of the facility caused by, for example, the number of persons there.

Figure 3B:
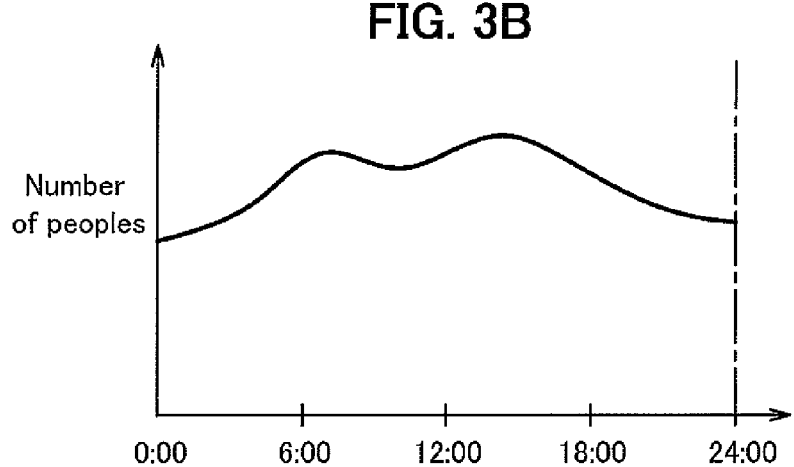
FIG. 3B shows a variation in the number of persons in an airport building where the air conditioning system according to the embodiment is installed.

The number of persons in the airport building i.e., the number of persons using the airport, increases and decreases according to the time as shown in FIG. 3B. More specifically, in the example shown in FIG. 3B, the number of persons using the airport building is large at about 7:00 and 13:00 and smallest at about 0:00. Accordingly, if only the number of users is regarded, the intake outdoor air quantity from the outside becomes largest at about 7:00 and at about 13:00. Therefore, the air conditioning load becomes large. On the other hand, at about 0:00 the intake outdoor air quantity become smallest. Accordingly, the air conditioning load becomes small.

In the embodiment, the number of persons in the airport building is determined below. The number of the persons working in the airport building generally hardly varies. Accordingly, variation in the number of persons in the airport building is mainly caused by the number of the departing persons and the number of arriving persons using air planes. Accordingly, in the embodiment, the number of persons in the airport building is determined on the basis of the number of persons using air planes, etc.

In the embodiment, the operation controller 50 is connected, with electric signal lines (not shown), to servers (not shown) of airline companies to which the air planes departing from and arriving at the airport belong. Accordingly, the operation controller 50 (more specifically, the data acquiring unit 51) can obtain the number of passengers getting on the air planes departing from and arriving at the airport, the number of departing and arriving air planes, and departure time and arriving time of the airplanes. Accordingly, the operation controller 50 can obtain the number of persons using the airport automatically without actual measurement.

(Building Load Data)

Building load data is data, regarding the building (airport building), indicating a capability of a load application to the air conditioning unit 9. The building load is mainly classified into an ambient load and a sunlight load. The ambient load is heat invading into the inside from the outside through the outer walls, roofs, and floors and proportional to a temperature difference between the outside and the inside of the airport building. However, the outside temperatures of the airport building are temperatures obtained by considering affection by the sunlight on the outer walls of the airport building, i.e., surface temperatures of the outer walls, the roofs, etc at every hour. The ambient load can be calculated at every hour on the basis of the outdoor air temperature and sunlight status.

In addition, the sunlight load corresponds to a heat energy of sunlight incident through windows of the airport building and depends on specifications of glass, blinds, an incident angle of the sun, and an intensity of sunlight at the area of the airport. The sunlight load can be calculated at every season, at every hour when the shape and specifications (of wall members) of the airport building are determined.

(Internal Load Data)

The internal load data is data regarding the inside of the airport building and indicating a capability of a load application to the air conditioning unit 9. The internal load mainly includes heat generated by illumination, power consumption from power source from wall outlets, and by persons in the airport building. The former heat is determined by the operating condition of the airport building. In addition, the latter heat is determined by a method similar to the method described regarding "outdoor air load data". Accordingly the internal load data largely varies in accordance with the operating status of the facility caused by, for example, the power consumption or the number of persons.

<Step S102>

Next, the load predicting unit 52 determines the air conditioning load on the basis of the data obtained by the data acquiring unit 51. More specifically, the load predicting unit 52 reads out the load data (the outdoor air load data, the building load data, and the internal load data at every hour obtained by data acquiring unit 51) stored in the load data database 58 and calculate the loads. More specifically, the calculated loads are determined as, for example, "Outdoor air load is X [kW], Building load is Y [kW], Internal load is Z [kW] at 10:00." The load predicting unit 52 adds the outdoor air load, the building load, and the internal load. Accordingly, the air conditioning load at the hour is calculated.

Figure 3C:
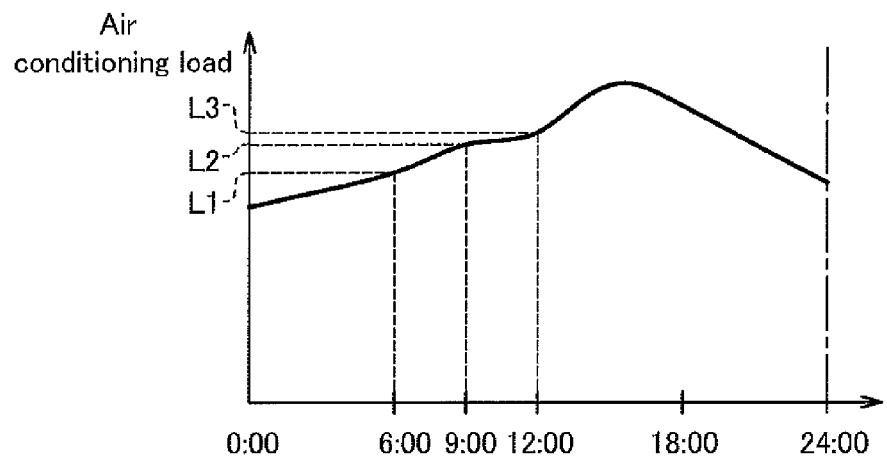
FIG. 3C shows a variation in the air conditioning load of the air conditioning unit.

FIG. 3C shows an example of the air conditioning load calculated in a chart. The air conditioning load gradually increases from, for example from 6:00 to 12:00. Particularly, as described with reference to FIG. 3B, the number of persons becomes a peak at about 7:00. However, the number of persons after 7:00 once decreases up to about 13:00. However, because of increase in the ambient temperature (FIG. 3A) the air conditioning load continues to increase after 7:00 (from about 6:00 to about 12:00). However, because the number of persons is smaller than the peak status (from about 6:00 to about 9:00), an increase extent of the air conditioning load becomes small (from about 9:00 to about 12:00).

Figures 4, 5:
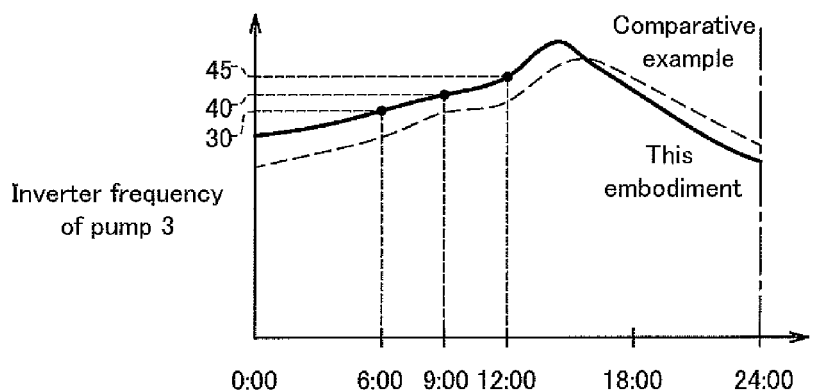
FIG. 4 shows a table of data in the control database in the air conditioning system using the deep seawater according to the embodiment.
FIG. 5 is a chart showing frequency variations of an inverter for the pump between the embodiment and a comparative example in which the load prediction is not performed.

In addition, as shown in FIG. 3C, it is assumed that the air conditioning load predicted at 6:00 is L1, the air conditioning load predicted at 9:00 is L2, and the air conditioning load predicted at 12:00 is L3 (these are described latter with reference to FIG. 4).

The load based on the load data can be calculated on the basis of, for example, past data. In addition, a qualitative calculation formula is previously determined and the load can be calculated by the determined calculation formula. More specifically, for example, the outdoor air load can be calculated by Eq. (1).

$$\text{Outdoor air load} = \{(\text{outdoor air specific enthalpy}) - (\text{room air specific enthalpy})\} \times (\text{drawn outdoor air quantity}) \times (\text{air specific gravity}) \qquad \text{Eq. (1)}$$

The term "specific enthalpy" is an energy quantity in the air per a unit weight.

<Step S103>

The flow rate calculating unit 53 calculates a flow rate of the deep seawater to be pumped on the basis of the air conditioning load determined in the step S102 (Step S103). In other words, the larger the predicted air conditioning load becomes, the larger quantity of the cold air should be supplied into the airport building. Accordingly, in such a case, the control is made for pumping a larger quantity of the deep seawater. On the other hand, when the predicted air conditioning load is small, a small quantity of the cold air supplied to the airport building is sufficient. Accordingly, a flow rate of the deep seawater to be pumped becomes small. In this way, in the step S103, the flow rate of the deep seawater to be pumped is calculated on the basis of the determined air conditioning load in the step S103.

More specifically, a flow rate Q of the deep seawater can be calculated on the basis of Eq. (2).

$$Q = W/(4.2\Delta t) \qquad (2)$$

W is the determined air conditioning load, and $\Delta t$ is a temperature difference between the temperature measured by the temperature sensor T33 (see FIG. 1) and the temperature measured by the temperature sensor T34 (see FIG. 1). In the embodiment, it is assumed that $\Delta t$ is constant (for example, 7 degrees Celsius). Accordingly, when the air conditioning load W is determined, the flow rate Q is uniquely determined.

<Step S104>

Next, the flow velocity calculating unit 54 calculates the flow rate of the deep seawater on the basis of the flow rate calculated in the step S103 (step S104). Because the inner diameter, etc. of the pipes forming the air conditioning system 100 are known, the flow velocity can be calculated by dividing the flow rate calculated in the step S103 by a cross section area of a pipe 70.

<Step S105>

In a step S105, the time lag calculating unit 55 calculates a time lag (starting timing of pumping the deep seawater) on the basis of the flow velocity calculated in the step S104.

When the air conditioning load becomes large, and the higher the flow velocity of the deep seawater becomes, the shorter the time period becomes from when the deep seawater is drawn to when the cold energy reaches the air conditioning unit 9. When the cold air is supplied to the airport building, the air conditioning load of the airport building starts to vary. Accordingly, the faster the flow velocity of the deep seawater, the later the timing when the deep seawater is pumped prior to the predicted load variation becomes. In other words, the time lag becomes short. On the other hand, when the air conditioning load becomes small, the flow rate becomes slow. The slower the flow velocity becomes, the longer time lag becomes.

Then, in the step S105, the time lag calculating unit 55 determines how prior to time corresponding to the predicted air conditioning load on the basis of the flow velocity calculated in the step S104. In other words, on the basis of the calculated flow velocity, the time lag is calculated.

<Step 106>

In a step S106, the database generating unit 56 generates the control database 60 on the basis of the calculation results of the steps S104 and S105. Hereinbelow will be described a specific method of preparing the control database 60.

First, the database generating unit 56 refers the pump parameter database 59 and reads out the inverter frequency corresponding to the flow velocity calculated in the step S104. In other words, when the pumps 3, 5, and 8 are operated by the read inverter frequencies, the deep seawater and the coolants flow to have calculated flow velocities, respectively.

Next, in the step S105, control start time is calculated on the basis of the time lag calculated in the step S105. In the embodiment, the pump 3 is most remote from the air conditioning unit 9, and the pump 8 is nearest to the air conditioning unit 9. Accordingly, a control of the pump 3 is first started, and then control of the pump 5, and a control of the pump 8 are started in this order. Accordingly, the control start time is determined in consideration of the distances to the respective pumps 3, 5, and 8 and the air conditioning unit 9 and time from when the control of the pumps 3, 5, and 8 is started until the control becomes stable (for example, about 100 s) together with the time lag (including a stable time for the time lag).

Specific single distances of respective sections in the embodiments are as follows:

A single distance of the secondary system pipes forming the secondary system is about 3.5 km, and a single distance of the tertiary system pipes forming the tertiary system is about 1 km.

FIG. 4 shows this as a specific example where a control database is shown in the air conditioning system using the deep seawater according to the embodiment. FIG. 4 shows examples of load variation time at 6:00, at 9:00, and at 12:00. In actual, calculation and storing data are performed at a shorter interval. For example, when the load variation time is at 6:00, to have a flow velocity corresponding to the air conditioning load L1 at 6:00, as the control start time of the pump 3, "at 5:16" is stored, as the control start time of the pump 5, and "at 5:21" is stored, as the control start time of the pump 3, "at 5:50" is stored, and the inverter frequency of 30 Hz is stored.

Similarly, values at other hours are also calculated, and the control database 60 is generated.

<Step S107>

On the basis of the generated control database 60, the controller 57 controls (feed-forwards) the pumps 3, 5, and 8. More specifically, at 5:16, the controller 57 controls the pump 3 to have the inverter frequency of 30 Hz. This changes the flow rate of the deep seawater flowing through the primary system (see FIG. 1).

Next, at 5:21, the controller 57 controls the pump 5 to have the inverter frequency of 30 Hz. This changes the flow rate of the coolant flowing through the secondary system. The changed flow rate enables a preferable heat exchange between the deep seawater in the primary system and the coolant in the secondary system. The cold energy in the deep seawater is transferred to the coolant in the heat exchanger 4 at about 5:21, and then the coolant flows through the secondary system, and then the cold energy is transferred to the coolant flowing through the tertiary system in the heat exchanger 6 at about 5:50.

Further, at 5:50, the controller 57 controls the pump 8 to have the inverter frequency of 30 Hz. This changes the flow rate of the coolant flowing through the tertiary system. In addition to this, the cold energy in the coolant flowing through the secondary system and transferred in the heat exchanger 4 is transferred to the coolant flowing through the tertiary system in the heat exchanger 6. The cold energy is transferred to the coolant in the heat exchanger 6 and carried by the coolant flowing through the tertiary system to the air conditioning unit 9, and supplied to the airport building as the cold air from the air conditioning unit 9 at about 6:00. As a result, the cold air corresponding to the air conditioning load at 6:00 is supplied to an inside of the airport building.

In summary, the operation controller 50 is configured to drive at least the pumps 5 and 8 at timing when a variation is anticipated in the air conditioning load (predicted heat load) on the basis of the air conditioning load (predicted heat load of the airport building) shown in, for example, FIG. 3C and the time lags due to lengths of at least the secondary system and the tertiary system (coolant circulating system). The air conditioning load is predicted by the predicted value of the operating status of the airport building (target facility) (for example, the number of persons shown in FIG. 3B) and the predicted value of weather status of the place where the airport building is placed (for example, ambient temperature shown in FIG. 3A).

Movements of the deep seawater, the coolant flowing through the secondary system, and the coolant flowing through the tertiary system in the air conditioning system 100 will be described.

(Steady Operation)

When the air conditioning load is constant, and the cold energy supplied to the air conditioning unit 9 is constant, a control is made as follows:

The deep seawater (generally about 4 to 8 degrees Celsius) is pumped by the pump 3 at a peak time flow rate when the air conditioning load becomes the maximum load, for example, at about 25 t/min. The pumped deep seawater flows through the primary system at a flow velocity of, for example, 2 m/s. A single distance between the intake and the heat exchanger 4 is, for example, about 4 km. Accordingly, the deep seawater pumped through the intake increases in temperature by one degree Celsius during flowing through the primary system which is about 4 km. More specifically, the temperature measured by the temperature sensor T12 is, for example, about 5 to 9 degrees Celsius.

For example, the deep seawater of about 5 to 9 degrees Celsius is heat-exchanged with the coolant flowing through the secondary system in the heat exchanger 4. Accordingly, the coolant of which temperature is decreased flows through the secondary system, for example, at a flow velocity of 2 m/s and supplied to the heat exchanger 6. A distance between the heat exchanger 4 and the heat exchanger 6 is (single distance of the secondary system pipes) is, for example, about 3.5 km. However the coolant moving from a heat exchanger 4 to the heat exchanger 6 is kept cold and it is not easy to absorb heat from the outside. Accordingly, the temperature of the coolant just before the coolant is supplied to the heat exchanger 6 hardly changes from the temperature just after the coolant is exhausted from the heat exchanger 4 (temperature measured by a temperature sensor T22) and is, for example, about 7 degrees Celsius. The coolant is heat-exchanged with the coolant flowing through the tertiary system in the heat exchanger 6. Accordingly, the temperature of the coolant flowing through the tertiary system decreases.

The coolant in the secondary system which has given the coolant flowing through the tertiary system the cold energy increases in temperature, for example, to 14 degrees Celsius. The temperature is a measured by the temperature sensor T24. The coolant increased in temperature to 14 degrees Celsius flows through the secondary system (for example, about 3.5 km) with absorption of heat from the outside.

At this time, the coolant just before being returned to the heat exchanger 4 more increases in temperature (the temperature measured by a temperature sensor T21) because there is no heat insulating member, so that the temperature becomes about 18 degrees Celsius with temperature rise of, for example, 4 degrees Celsius.

The coolant flowing through the tertiary system of which temperature has been lowered as a result of receiving the cold energy in the heat exchanger 6 flows through the tertiary system at a flow velocity of, for example, 2 m/s and is supplied to the air conditioning unit 9. A distance between the heat exchanger 6 and the air conditioning unit 9 (single distance of the tertiary system pipes) is about 1 km. The coolant supplied to the air conditioning unit 9 is heat-exchanged with the air by the heat exchanger 9a, so that the cold air is supplied inside the airport building. On the other hand, the coolant having given the cold energy to the air increases in temperature and is returned to the heat exchanger 6.

(Operation with Air Conditioning Load Variation)

When the flow rate varies from that in the steady operation because the predicted air conditioning load varies, the following control is made.

First, the inverter frequencies of the pumps 3, 5, and 8 are changed at control start time stored in the control database 60. However, the inverter frequencies of the pumps 3, 5, and 8 are not changed at the same time, but the inverter frequency of the pump 3 is changed first and the inverter frequencies of the pumps 5 and 8 are changed in this order. More specifically, when a predetermined time interval elapsed after the inverter frequency of the pump 3 is changed at the control start time, the inverter frequency of the pump 5 is changed. Then, for a while, the deep seawater flowing through the primary system and the coolant flowing through the secondary system are allowed to flow in this status, respectively. This stabilizes the flow rates of the circulated deep seawater and the coolant. In addition, the temperature of the deep seawater measured by the temperature sensor T12 and the temperature of the first coolant measured by the temperature sensor T22 are stabilized.

After stabilization of these parameters, the inverter frequency of the pump 8 is changed. Then, for a while, the coolant flowing through the tertiary system is circulated, so that the flow rate of the circulated coolant is stabilized. In addition, the temperature of the coolant measured by the temperature sensor T23 and the temperature of the coolant in the tertiary system measured by the temperature sensor T32 are stabilized. Accordingly, the cold air corresponding to the air conditioning load at time for prediction is supplied to the inside of the airport building by the air conditioning unit 9.

As described above, in the embodiment, the system (coolant circuiting system) in which the coolants circulate, includes the coolant circulating system on the side of the deep seawater (the secondary system shown in FIG. 1) and the coolant circulating system on an air conditioning side which is on the side of the heat exchanger 9a (heat exchanger for air conditioning) (the tertiary system, etc. shown in FIG. 1). The coolant circulating system on the side of the deep seawater (secondary system) and the coolant circulating system (tertiary system) on the air conditioning side are provided with the pumps 5 and 8 and pipes (not shown).

In addition, there is provided the heat exchanger 6 for heat exchange between the coolant circulating system (secondary system) on the deep seawater side and the coolant circuiting system on the air conditioning side (tertiary system).

Further, as a pumping device for pumping the deep seawater from the sea, the pump 3 is provided for pumping the deep seawater. For example, the drive schedule shown in FIG. 4 is set for the respective pumps 3, 5, and 8 in which the pump 3 remote from the heat exchanger 9*a* is operated at the earlier timing than that of the pump 8 which is near the heat exchanger 9*a*.

<Conclusion>

FIG. 5 shows a chart showing variations of the inverter frequency of the pump 3 for comparison between the embodiment of the present invention and a comparative example having no load prediction. More specifically, the curve of the embodiment (solid line) represents variation in the inverter frequency at every hour in the air conditioning system 100 according to the embodiment. The curve of the comparative example (broken line) represents variation in the inverter frequency at each hour in a conventional air conditioning system without load prediction.

In the comparative example shown in FIG. 5, the load prediction is not made, but a feedback control is made in which a flow rate control is performed after occurrence of the load variation. More specifically, conventionally, the flow rate control is made after occurrence of the load variation correspondingly. Therefore, the curve of the comparative example is similar to the shape of the load variation (not shown).

On the other hand, in the embodiment, a load variation at certain time is predicted and to perform air conditioning corresponding to the load variation at the time, the flow rate control is performed prior to the time. This control is a feedforward control. Accordingly, as shown in FIG. 5, the curve of the embodiment of the present invention looks like the curve of the comparative example, which is shifted left on the drawing.

However, actually, the curve of the embodiment is not the curve of the comparative example shifted left. As described above, in the embodiment, the time lag, i.e., the control start time, is determined on the basis of the calculated flow velocity. More specifically, when the calculated flow velocity is high, the control start time is delayed because the cold energy can reach the heat exchangers earlier. On the other hand, when the calculated flow velocity is low, the control start time is advanced because the cold energy reaches the heat exchanger later. Accordingly, in the air conditioning system 100 according to the embodiment the control start time is determined in consideration of the flow velocity in addition to the prediction of the air conditioning load. In other words, in the air conditioning system 100 according to the embodiment, the start time of the flow rate variation control is not uniformly advanced by the same time interval, but the advanced time is determined in accordance with the flow velocity corresponding to the predicted air conditioning load.

In summary, in the embodiment, at least the pumps 5 and 8 are feedforward-controlled using the drive schedule which is formed with drive target values of at least the pumps 5 and 8 shown in time series in FIG. 4. The drive target values are set on the basis of the air conditioning load (predicted heat load) as shown in FIG. 3C. The drive schedule is made such that the larger the drive target values of at least the pumps 5 and 8 become, and timing is adjusted such that the larger the circulating quantities of the coolant becomes, the smaller the time lag becomes. In other words, the drive schedule is made such that when the air conditioning load increases, the circulation quantity of the coolant is increased and when the circulation quantity increases, the time lag is decreased. These controls are performed by the operation controller 50.

The time lag includes stabilizing time for at least the secondary system and the tertiary system (coolant circulation system), the stabilizing time being caused by the lengths of at least the secondary system and the tertiary system (coolant circulating system).

Advantageous Effect Derived from Control without Time Lag Compensation and Control with Time Lag Compensation It is assumed that the airport building is air-conditioned with a target temperature. When passenger's comings and goings increase, the heat load in the airport building increases. Then, in the tertiary system, the fan 9*b* is operated more to maintain the target temperature. Accordingly, the coolant temperature of the tertiary system at the output port of the heat exchanger 9*a* (temperature detected by the temperature sensor T34) increases.

In the tertiary system, a single distance (distance of the tertiary system pipe) from the output port of the heat exchanger 9*a* to the input port of the heat exchanger 6 is 1 km, when the flow velocity of the coolant is 2 m/s, a temperature increase in the temperature sensor T34 at the output port of the heat exchanger 9*a* is measured after 500 s (about 8 min and 30 s). If heat capacities of pipes are considered, the detection of the temperature increase may be further delayed.

In addition, in the secondary system, it is assumed that the single distance from the output port of the heat exchanger 6 to the input port of the heat exchanger 4 is, for example, 3.5 km, and the flow velocity of the coolant is 2 m/s, the temperature of the temperature sensor T24 at the output port of a heat exchanger 6 is measured as an increases after 1750 s in the temperature sensor T21 at the input port of the heat exchanger 4 (after about 30 min). If heat capacities of pipes are considered, the detection of the temperature increase may be further delayed.

In such a status, when the heat load increases in the airport (not shown), the cold air necessary for cooling cannot be supplied timely from the deep seawater. Accordingly, the temperature in the airport building will increase. Alternatively, when the heat load in the airport building decreases, the pumps 5, 8, etc. consume excess powers.

However, according to the air conditioning system 100 of the present embodiment, an air conditioning system using the deep seawater in which a good tracking property and energy saving can coexist. More specifically, in the air conditioning system 100, the air conditioning load at certain time is predicted on the basis of information such as weather information. In addition, the deep seawater is pumped to supply the cold energy to the airport building corresponding to the predicted air load. With configuration as mentioned above, the deep seawater having the cold energy corresponding to the air conditioning load is pumped without wasteful drive power for the pumps, etc. According to the air conditioning system 100, a preferable energy saving is provided. Further, no excessive deep seawater is pumped.

In the air conditioning system 100, the cold energy corresponding to the predicted air conditioning load is supplied to the air conditioning unit 9 at time when the air conditioning load occurs. Accordingly, the preferable tracking performance is provided by previously obtaining the cold energy corresponding to the air conditioning load and supplied to the cold energy to the air conditioning unit 9 at time when the actual air conditioning load occurs.

Because the cold energy corresponding to the air conditioning load is supplied to the air conditioning unit 9, the flow velocity of the deep seawater varies with a quantity of the air conditioning load. More specifically, when the cold energy to be supplied increases in quantity, much deep seawater is pumped, so that the flow velocity of the deep seawater increases. On the other hand, when the cold energy to be supplied decreases, the pumped deep seawater becomes small in quantity, so that the flow velocity of the deep seawater becomes slow.

When the flow velocity of the deep seawater varies, time period necessary for reaching the air conditioning unit 9 also varies.

Not only in the air conditioning system 100 according to the embodiment, but also in the air conditioning system using the deep seawater, the distance between the intake of the deep seawater and the air conditioning unit 9 are long (in this embodiment, the distance is about 8.5 km). Accordingly, there is a tendency that variation in time period necessary for reaching due to variation of the flow velocity becomes large. Therefore, when the control start time is uniformly advanced from time when the air conditioning load varies, time when the cold energy is supplied to the air conditioning unit 9 may shift from the time when the predicted air conditioning load occurs.

In the air conditioning unit 9 according to the embodiment, the control start time is not set by uniformly advancing, but set in accordance with the flow velocity of the deep seawater having the cold energy. More specifically, for example, when much cold energy is supplied because increase in the air conditioning load, the flow velocity becomes faster. Accordingly, the control start time is set to be rather later. On the other hand, when a small quantity of the deep seawater is sufficient because the air conditioning load comes small, the flow velocity becomes slow. Accordingly, the control start time is set rather earlier. With such a configuration, at an hour when the predicted air conditioning load occurs, a desired cold energy can be supplied more surely.

The air conditioning system 100 according to the embodiment is applied to the air conditioning for the airport building (more specifically, cooling). Accordingly, the air conditioning load can be predicted using parameters regarding the airport building, such as the number of persons getting on aircrafts depicturing and reaching the airport, the number of the air crafts denaturing and reaching, departure and reaching time of the aircraft. More specifically, for example, by grasping these parameters, the number of persons in the airport building can be specified. The air conditioning load generally increases when the number of persons in the airport building increases, so that the air conditioning load can be predicted from the specified number of the persons in the airport building.

Particularly, when the operation controller 50 shown in FIG. 1 is connected to a reserve server (not shown) of, for example, an air plane company, the operation controller 50 can automatically obtain the data. Accordingly, the air conditioning load can be automatically predicted without any special operation, so that the air conditioning control can be automatically performed.

In addition, the coolant of the secondary system supplying the cold energy to the tertiary system in the heat exchanger 6 is returned to the heat exchanger 4 without the temperature kept with heat insulating materials, etc. Because the distance between the heat exchanger 4 and the heat exchanger 6 is long (a single distance of the secondary system pipes: about 3.5 km in the embodiment), the first coolant is heated by the external heat. Accordingly, the temperature (measured by the temperature sensor T21) of the coolant of the secondary system which is outputted from the heat exchanger 6 and just before being supplied to the heat exchanger 4 is higher than the temperature of the coolant just after being outputted from the heat exchanger 6.

In the air conditioning system 100 according to the embodiment, a part of the deep seawater supplied to the secondary system by the heat exchanger 4 is supplied to the seawater desalination plant for seawater desalination with a reverse osmosis membrane (RO membrane). Accordingly, when the coolant of the secondary system of which temperature is increased is supplied to the heat exchanger 4, a temperature of the deep seawater in the primary system exhausted from the heat exchanger 4 also increases. Then the deep seawater supplied to the reverse osmosis membrane increases in temperature. In the process using the reverse osmosis membrane, the higher the deep seawater temperature is, the higher the seawater desalination efficiency is. According to the air conditioning system 100 of the present invention provides fresh water at a high efficiency without any special member and special control.

In addition, during the flow rate changing controlling by the operation controller 50, the inverter frequency of the pump 3 is changed first, and then the flow rate of the deep seawater of the primary system is changed. After that, the flow rate of the coolant of the secondary system is changed by changing the inverter frequency of the pump 5. Next, the inverter frequency of the pump 8 is changed to change the flow rate of the coolant of the tertiary system. As described above, the flow rate of the primary system is first controlled which has a largest time lag and being remote from the air conditioning unit 9 which is a releasing source of the cold energy, so that a preferable tracking performance can be obtained.

Modifications

The air conditioning system 100 according to the embodiment has been described. However, the present invention is not limited to the described contents. Accordingly, the invention can be carried out with modification arbitrary without departure from the subject matter of the invention.

For example, in the embodiment described above, the air conditioning system is applied to the airport and the airport building. However, the present invention can be applied to other buildings (for example, a hall, and gym). In addition, the installation place of the air conditioning unit is not limited to indoor space, but may be installed outside. The load information for predicting the air conditioning load is appropriately determined in accordance with kind and structure of the building and the location of the air conditioning unit to which the invention is applied.

In addition, the load information is not limited to the kind of the loads, but may be appropriately selected. Particularly, in the embodiment, the load information has been described regarding the airport. However, the control is not limited to use only the load information regarding the airport, etc.

In addition, the values stored in the respective database described with reference to FIGS. 1 and 2, are not limited to the example in the drawings. Accordingly, the values stored in these databases can be optionally determined. In addition, the values calculated by respective units are directly used for control without generation and using of the databases.

Further, in FIG. 1, three systems, i.e., the primary system, the secondary system, and the tertiary system are used. However, the primary system and the secondary system may be combined as one system. More specifically, like an air conditioning system 200 as shown in FIG. 6, the pumped deep seawater and the coolant (tertiary system) supplied to the air conditioning unit 9 may be directly heat-exchanged.

In addition, the deep seawater is stored in a pool installed several-meters to tens meters under ground with natural flow using the principle of siphon and pumped from the pool, so that the time lag is shortened, which makes the calculation easy. Further, the power for pumping the deep seawater from extremely deep place can be saved.

Further, the system can be configured with designing modification without departure from the subject matter of the present invention.

BRIEF DESCRIPTION OF REFERENCE SYMBOLS 3, 5, 8 Pumps (pump in pumping device)
4 Heat exchanger (seawater-coolant heat exchanger)
6 Heat exchanger
9 Air conditioning unit
9a Heat exchanger (air conditioning heat exchanger)
50 Operation controller
21 Data acquiring unit
52 Load predicting unit
53 Flow rate calculating unit
54 Flow velocity calculating unit
55 Time lag calculating unit
56 Database generating unit
57 Controller
58 Load data database
59 Pump parameter database
60 Control database
100, 200 Air conditioning system

The invention claimed is:

1. An air conditioning system using deep seawater, comprising:
a first pump pumping deep seawater of a sea;
a seawater-coolant heat exchanger receiving the pumped seawater, and performing heat exchange between a cold energy in the pumped deep seawater and a coolant;
an air conditioning heat exchanger receiving the coolant, and performing heat exchange with the coolant which was cooled by the cold energy in the deep seawater, to release the cold energy in a target facility to cool the target facility;
a fluid circulating system circulating the coolant between the seawater-coolant heat exchanger and the air conditioning heat exchanger through a pipe using a second pump; and
an operation controller controlling driving of the first pump at timing in advance when a variation is anticipated in predicted heat loads of the target facility, the timing being based on a prediction operation status value and a predicted weather status value of the target facility, and based on a time lag due to a length of the pipe in the fluid circulating system;
wherein the operation controller performs respective different feedforward control for the first pump and the second pump, using drive target values in time series of the first pump and the second pump as a drive schedule, which drive target values are set on the basis of the predicted heat load and the time lag; and
wherein the drive schedule increases the drive target value of the first pump such that the larger the predicted heat load becomes, the larger a circulation quantity of the coolant becomes, and adjusts the timing such that the larger the circulation quantity is, the smaller the time lag.

2. The air conditioning system as claimed in claim 1, wherein
the time lag includes a stabilizing time for the fluid circulating system, determined in consideration of the length of the pipe in the fluid circulating system.

3. The air conditioning system as claimed in claim 1, wherein
the fluid circulating system includes a deep seawater side fluid circulating system on a deep seawater side, and an air conditioning side fluid circulating system on an air conditioning heat exchanger side, wherein
the drive schedule is set to operate the first pump of the deep seawater side fluid circulating system at earlier timing than a timing when the second pump of the air conditioning side fluid circulating system.

4. An air conditioning system using deep seawater, comprising:
a first pump pumping deep seawater of a sea;
a seawater-coolant heat exchanger receiving the pumped seawater, and performing heat exchange between a cold energy in the pumped deep seawater and a coolant;
an air conditioning heat exchanger receiving the coolant, and performing heat exchange with the coolant which was cooled by the cold energy in the deep seawater, to release the cold energy in a target facility to cool the target facility;
a fluid circulating system circulating the coolant between the seawater-coolant heat exchanger and the air conditioning heat exchanger through a pipe using a second pump, wherein a flow velocity of the coolant in the fluid circulating system is variably-settable; and
an operation controller controlling driving of the first pump at timing in advance when a variation is anticipated in predicted heat loads of the target facility, the timing being based on a prediction operation status value and a predicted weather status value of the target facility, and based on a time lag due to a length of the pipe and a current flow velocity set for the coolant in the fluid circulating system;
wherein the operation controller performs respective different feedforward control for the first pump and the second PUMP, using drive target values in time series of the first pump and the second pump as a drive schedule, which drive target values are set on the basis of the predicted heat load and the time lag; and
wherein the drive schedule increases the drive target value of the first pump such that the larger the predicted heat load becomes, the larger a circulation quantity of the coolant becomes, and adjusts the timing such that the larger the circulation quantity is, the smaller the time lag.

* * * * *